United States Patent Office 3,746,570
Patented July 17, 1973

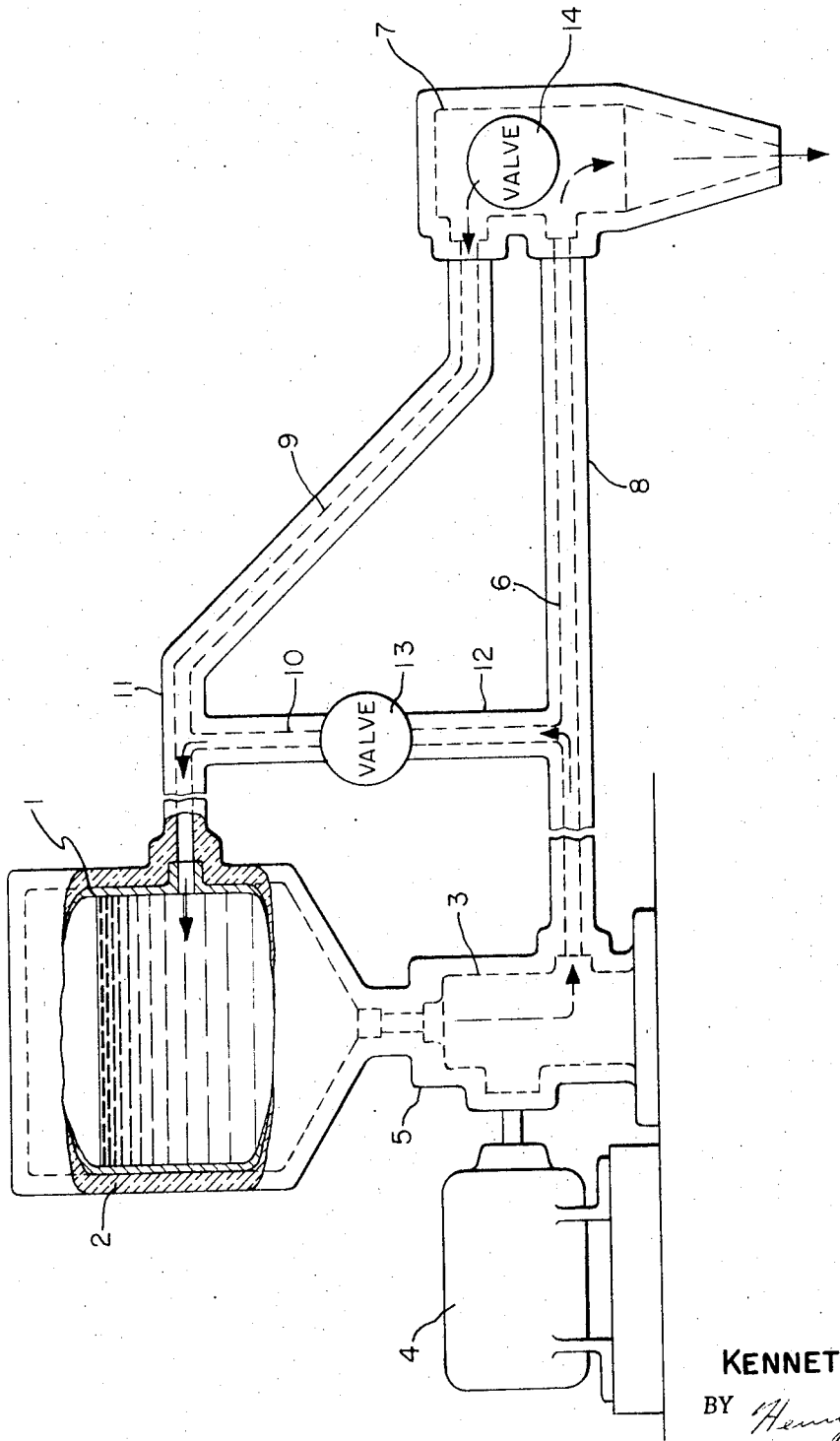

3,746,570
METHOD FOR APPLICATION OF VISCOUS HOT MELT ADHESIVE
Kenneth W. McIntosh, Cuyahoga Falls, Ohio, assignor to The Goodyear Tire & Rubber Company, Akron, Ohio
Continuation of abandoned application Ser. No. 837,068, June 27, 1969. This application July 22, 1971, Ser. No. 165,371
Int. Cl. B05c 11/10; B65d 5/62
U.S. Cl. 117—102 A
1 Claim

ABSTRACT OF THE DISCLOSURE

A method and apparatus for application of a viscous hot melt adhesive at an elevated temperature which comprises in a heated apparatus substantially encompassed by heating means, the steps of (a) applying a molten viscous hot melt adhesive at a temperature of from about 150° C. to about 300° C. and, in such molten state having a viscosity of from about 800 to about 200 poises, to a positive displacement pumping means, (b) dispensing the said molten hot melt adhesive continuously from the positive displacement pumping means, and (c) recycling at least a portion of the molten hot melt adhesive through the pumping means. This method and apparatus have particular utility for the application of high viscosity hot melt adhesives for rapidly securing adhesive bonds during the lasting of shoes, in construction of various articles and in packaging.

This application is a streamline continuation of application Ser. No. 837,068, filed June 27, 1969, now abandoned.

This invention relates to an improved method of applying hot melt adhesives and to an apparatus therefor. More particularly, the invention relates to a method and apparatus for the application of high viscosity hot melt adhesives at high temperatures.

Hot melt adhesives are a well-known class of adhesive compositions useful in many industrial applications. The hot melt adhesives are sometimes called hot melts and generally are solid or semi-solid mixtures of various resins, including tackifying resins, polymeric materials including thermoplastic and rubbery polymers, waxes, plasticizers, pigments and other additives. Hot melt adhesive bonds are advantageously obtained by melting the hot melt to a flowable tacky molten state, applying it to a substrate, adhering another surface over the hot melt coating, and cooling the hot melt to a temperature below its melting point to form an adhesive bond between the substrates.

Hot melts are particularly advantageous adhesives, as opposed to the wet adhesives, because they set and bond quickly, thereby greatly reducing the time required for adhesive application and also reducing the time required for holding the bonded substrates together. Thus, in commercial practice, fabrication of various materials can be accomplished much more quickly. Furthermore, hot melt adhesives generally do not have the clean-up problem common to cold adhesives.

Therefore, in commercial practice, it is desired to provide hot melts and methods of applying hot melts that will set up and bond even more quickly and will stand up under higher temperatures of use, warehousing and shipping.

However, methods for the normal application of hot melt adhesives are typically unsatisfactory for the commercially successful application of the higher melting point, high viscosity hot melts at high temperatures.

Therefore, it is an object of this invention to provide a method for the application of high melting point and highly viscous hot melt adhesives at elevated temperatures.

It is a further object to provide an apparatus for such an application.

The advantages and objects of this invention may be more readily understood by reference to the drawing which is a diagrammatic view showing an apparatus substantially and essentially entirely encompassed by heating means for the application of a high viscosity hot melt adhesive at high temperatures.

Reference to the drawing shows a hot melt adhesive having a softening point of about 90° C. and a melting point of about 140° C., such as a high molecular weight copolyester containing a small amount, such as about 10 percent by weight, of an unsaturated hydrocarbon-derived resin tackifier, in the reservoir tank 1. The hot melt was charged to the reservoir in solid pellet form at about 20° C. The reservoir tank 1 has a surrounding heating jacket 2, to which sufficient electrical heat is applied to raise the temperature of the hot melt adhesive to about 232° C., thereby melting it. An atmosphere of an inert gas such as nitrogen can be applied to the reservoir tank to retard degradation of the hot melt at the elevated temperature.

The melted adhesive, having a viscosity of about 750 poise, at 232° C. is allowed to gravity flow from the reservoir through the suction port of a positive displacement gear pump 3. The gear pump 3 is driven by motor 4 and has a surrounding electrically heated jacket 5 to maintain the adhesive in its liquid form at a temperature of at least 232° C. The positive displacement pump is actuated by the motor to pump the hot melt through the dispensing line 6 to the dispensing head 7. The dispensing line 6 has a surrounding electrically heated jacket 8 to maintain the hot melt in its liquid form at at least 232° C. A portion of the hot melt dispensed into an atmosphere having a temperature of about 20° C. to about 60° C. between two substrate surfaces where it is solidified essentially immediately or within a few seconds to form a strong bond between the surfaces. Another portion of the hot melt is recirculated back to the reservoir and through the pump by the return lines 9, connected to the dispensing head or through the return line 10. The dispensing and return lines have surrounding electrically heated jackets 8, 11 and 12 respectively to maintain the hot melt above its melting point and in its liquid form at at least 232° C. They can be solid or flexible to facilitate positioning of various substrates. The rate of recycle is controlled primarily by the pumping rate of the pump 3 and by the valves 13 and 14. It is generally preferred to recycle a portion of the hot melt as a means of mixing since at these elevated temperatures the hot melt can degrade. Thus, as described, the apparatus is substantially encompassed by heating means adjusted to maintain the hot melt above its melting point without the necessity of relying upon the sensible heat of portions of the apparatus or hot melt to do so. In this drawing the positive displacement pump is exemplified by a gear pump. It is understood that other positive displacement pumps may be used such as a positive piston-type displacement pump.

Thus, in accordance with this invention it has been found that a method of applying viscous hot melt adhesives at elevated temperature comprises in a heated apparatus substantially encompassed by heating means, the steps of (a) applying or charging a molten viscous hot melt adhesive at a temperature of from about 150° C. to about 300° C. and in such molten state having a corresponding viscosity of from about 800 to about 200 poises, to a positive displacement pumping means, (b) dispensing the said molten hot melt adhesive from the positive displacement pumping means, and (c) recycling at least a portion of the molten hot melt adhesive through the pumping means. Thus, preferably, the molten hot melt having a viscosity of from about 200 to about 800 poises is continuously charged to the positive displacement pumping means at a temperature of from about 150° C. to about 300° C. and dispensed therefrom onto at least one substrate in an atmosphere of from about 0° C. to about 100° C. and preferably from about 20° C. to about 80° C., where it quickly hardens or sets up in about 2 to 5 seconds. The pumping means itself, as well as its dispensing lines and dispensing head, if used, are substantially encompassed by heating means adjusted to operate at the temperature range of from about 150° C. to about 300° C. It is understood that various heating means can be used, such as electrical, superheated steam and radiant.

In the practice of this invention the hot melt preferably has a melting point of from about 100° C. to about 200° C. It is further preferred that the apparatus is operated at a temperature of from about 150° C. to about 280° C. and is more preferred that the hot melt in this temperature range has a viscosity of from about 200 to about 700 poises.

The method of this invention has particular utility for the application of high viscosity hot melt adhesives for rapidly securing insoles to lasts to hold them against displacement during the lasting of shoes. Thus, it is useful for the application of such hot melt adhesives for adhering shoe soles to uppers, as well as wood, metal and plastic construction and in packaging.

The method can be practiced with the various adhesives having high viscosity ranges at elvated temperatures described herein, such as thermoplastic synthetic polymeric materials. Representative examples of such hot melt adhesives include thermoplastic linear copolyesters such as those comprising units derived from tetramethylene terephthalate and isophthalate, as well as those having units derived from tetramethylene terephthalate/isophthalate/sebacate. Those skilled in the art would understand that various additives such as resinous tackifiers, particularly those derived from unsaturated hydrocarbons, fillers, pigments and antioxidants can be added to the hot melt including other hot melts having lower viscosities.

The following example further illustrates the invention and is not intended to be limiting. In the example, the parts and percentages are by weight unless otherwise indicated.

EXAMPLE I

An apparatus was constructed, similar to the type shown in the accompanying drawing, consisting of an electrically heated melt pot mounted above a positive displacement gear pump (type HPE-4741-1 gear pump obtained from The Zenith Products Company, West Newton, Mass.) fitted with an electrically heated jacket, electrically heated dispensing lines with a recycle line connected to recycle the hot melt back to the melt pot, and an electrically heated dispensing head. The gear pump was rated as having a pumping rate of 0.567 cubic centimeters per revolution at 100 percent efficiency. In this experiment it was found that the gear pump operated at about a 66 percent of the maximum efficiency.

A pelletized solid hot melt adhesive having a melting point of about 140° C. was charged to the melting pot where it was heated to about 232° C. The viscosity of the molten hot melt was about 675 poises at about 232° C. The hot melt adhesive was a 50/50 tetramethylene terephthalate/isophthalate linear polyester having an intrinsic viscosity of 0.65.

The molten hot melt was allowed to gravity flow and to be continuously applied to the suction port of the heated gear pump. The gear pump was heated to about 260° C. The motor actuated the pump to a pumping speed of 180 revolutions per minute and the hot melt was dispensed through the feeder lines which were heated to 260° C. at a rate of 65 cubic centimeters per minute to the dispensing head. The molten hot melt was dispensed from the dispensing head to the atmosphere having a temperature of about 25° C. to coat an aluminum substrate, also having a temperature of about 25° C. Over the hot melt coating was quickly applied another aluminum substrate, at about the same temperature, and the molten hot melt allowed to quickly cool in less than about five seconds and solidify to form a strong adhesive bond between the substrates. During the operation, a bypass line with a bypass valve and heating jacket heated to about 260° C. connected between the dispensing and return lines allowed the hot melt to recycle through the pump at a rate of from about 0 to about 65 cubic centimeters per minute, depending upon the degree of opening of the valve.

In this specification, the melting point of the hot melt was determined by differential thermoanalysis described in Goodyear Test Method R-145C.

The melt viscosity was determined by Goodyear Method R-140. A plot of the viscosity vs. temperature curve was prepared and from this curve the viscosity of the hot melt at various temperatures could readily be determined.

The melt viscosity determination Method R-140, in summary, is as follows:

A portion of the melt is melted in a controlled temperature bath. One end of a calibrated viscosity tube having a bore of about 1 to 2 millimeters is immersed in the melted melt and a sample of the melt is allowed to flow into its lower portion. The viscosity tube with sample is then withdrawn from the temperature bath. To the upper end of the calibrated viscosity tube is applied a reduced pressure of about 4-7 centimeters of mercury. The pressure differential across the sample is measured and the time for the melt to flow between two marks in the tube is also measured. From this information the viscosity of the melt is determined as:

$$\text{Viscosity} = \frac{N_{pt}}{p't'}$$

where N is the melt viscosity of a standard oil from the National Bureau of Standards; $p$ is pressure differential across the sample in centimeters of mercury; $p'$ is pressure differential in centimeters of mercury across a sample of the standard oil; $t$ is the time in minutes for the sample to flow between two marks on the tube; $t'$ is the time in minutes for the standard oil to flow between the two marks.

Thus, in accordance with this invention there is provided an apparatus substantially encompassed by heating means and heated to a temperature of from about 150° C. to about 300° C. for applying a molten viscous hot melt adhesive at an elevated temperature of from about 150° C. to about 300° C. and in such molten state having a viscosity of from about 800 to about 200 poises which comprises a heated positive displacement pumping means, a heated means for supplying molten adhesive to the pumping means, a heated dispensing means to dispense the molten adhesive from the pumping means and a heated recycle means to recycle the molten adhesive from the dispensing means through the pumping means.

Preferably the temperature difference between the hot melt and the application substrate is at least 100° C. and more preferably 150° C. to facilitate set-up times for the viscous hot melt such as 2-5 seconds.

In the method and apparatus described herein, positive displacement pumping means is used to practice this invention. It is exemplified that the positive displacement pumping means can be a gear pump, a piston-type pump, and such pumps are intended to include a heated extruder where portions of the hot melt are entrapped therein, pumped and displaced through and dispensed therefrom.

As exemplified herein, various hot melts can be used such as copolyesters of tetramethylene terephthalate and isophthalate and it is also specifically described herein that copolyesters of tetramethylene terephthalate/isophthalate/sebacate, although certainly the hot melts are not limited thereto. Other hot melts and particularly copolyesters can be used. Typical of the copolyesters are those having intrinsic viscosities of from about 0.6 to about 0.8 and having the proper viscosity range at the required elevated temperatures.

The term intrinsic viscosity (i.v.), is used herein as a measure of the degree of polymerization, or molecular weight, of the polyester. It is defined by the Billmeyer equation as follows:

$$\text{i.v.} = \tfrac{3}{4} \frac{\ln (\text{i.v.})_r}{C} + \tfrac{1}{4} \frac{(\text{i.v.})_{sp}}{C}$$

wherein $(\text{i.v.})_r$ is the viscosity of the dilute 60/40 phenol/tetrachloroethane mixed solvent solution of the polyester divided by the viscosity of the 60/40 phenol/tetrachloroethane mixed solvent itself measured under the same conditions as the polyester solution:

$$(\text{i.v.})_{sp} = (\text{i.v.})_r - 1$$

where $(\text{i.v.})_r$ is as defined above; and C is the concentration of the polyester in grams per hundred cubic centimeters of solution.

While certain representative embodiments and details have been shown for the purpose of illustrating the invention, it will be apparent to those skilled in this art that various changes and modifications may be made therein without departing from the spirit or scope of the invention.

What is claimed is:

1. A method for application of a molten heat degradable hot melt linear thermoplastic copolyester adhesive selected from copolyesters of tetramethylene terephthalate and isophthalate and copolyesters of tetramethylene terephthalate/isophthalate/sebacate at a high temperature and viscosity to a substrate at a substantially lower temperature where the molten adhesive has a set up time on said substrate of about 2 to about 5 seconds, which comprises the steps of:

(a) applying the hot melt adhesive in its viscous molten state at a temperature of from about 150° C. to about 300° C. and at a viscosity of from about 800 to about 200 poises from a heated reservoir in an inert atmosphere to a continuous positive displacement pumping means selected from a gear pump and an extruder, said pumping means encompassed by electrical heating means to maintain the adhesive at its elevated temperature range;

(b) dispensing the said viscous hot melt adhesive continuously from the pumping means through a flexible dispensing line and a dispensing head onto a substrate having a temperature of at least about 100° C. lower than the dispensed hot melt temperature, and (c) continuously recycling and mixing a portion of the molten hot melt adhesive from said dispensing line or head back through the pumping means through a heated recycle line, said dispensing line, recycle line and head substantially encompassed by electrical heating means to maintain the adhesive at its elevated temperature range.

References Cited

UNITED STATES PATENTS

| | | | |
|---|---|---|---|
| 2,651,586 | 9/1953 | Cooper et al. | 117—102 AX |
| 3,540,626 | 11/1970 | Eberle | 222—146 R |
| 3,521,789 | 7/1970 | Kraft | 222—146 R X |
| 3,206,125 | 9/1965 | Farrell | 222—146 HE X |
| 3,377,466 | 4/1968 | Paulsen | 222—146 R X |
| 3,429,482 | 2/1969 | Nord et al. | 222—146 R |
| 3,585,361 | 7/1971 | Rosen et al. | 222—146 HE X |
| 3,531,023 | 9/1970 | Mercer | 222—146 HE X |
| 2,544,661 | 3/1951 | Fossa | 222—146 HE X |
| 3,511,693 | 5/1970 | Davidson | 117—102 A |

ALFRED L. LEAVITT, Primary Examiner

J. R. BATTEN, JR., Assistant Examiner

U.S. Cl. X.R.

117—132 C, 161 K; 222—146 R, 146 HE, 152